(12) United States Patent
Smith et al.

(10) Patent No.: US 12,446,885 B2
(45) Date of Patent: Oct. 21, 2025

(54) EXTENDABLE CAPS FOR ENDOSCOPIC CLOSURE DEVICES

(71) Applicant: BOSTON SCIENTIFIC SCIMED, INC., Maple Grove, MN (US)

(72) Inventors: Paul Smith, Smithfield, RI (US); Richard Paul Mansfield, Sterling, MA (US); Alexander Joseph Burnham, Somerville, MA (US); Matthew Bradley Adams, Harvard, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 272 days.

(21) Appl. No.: 18/470,947

(22) Filed: Sep. 20, 2023

(65) Prior Publication Data

US 2024/0122599 A1   Apr. 18, 2024

Related U.S. Application Data

(60) Provisional application No. 63/379,394, filed on Oct. 13, 2022.

(51) Int. Cl.
*A61B 17/12* (2006.01)
*A61B 17/00* (2006.01)
*A61B 90/00* (2016.01)

(52) U.S. Cl.
CPC ........ *A61B 17/12013* (2013.01); *A61B 90/37* (2016.02); *A61B 2017/00367* (2013.01); *A61B 2090/3782* (2016.02)

(58) Field of Classification Search
None
See application file for complete search history.

(56) References Cited

U.S. PATENT DOCUMENTS

| 5,897,487 | A | 4/1999 | Ouchi | |
|---|---|---|---|---|
| 6,306,081 | B1* | 10/2001 | Ishikawa | A61B 1/018 600/116 |
| 2007/0167828 | A1* | 7/2007 | Saadat | A61B 5/6882 600/463 |
| 2007/0287886 | A1* | 12/2007 | Saadat | A61B 1/00097 600/115 |
| 2007/0293724 | A1* | 12/2007 | Saadat | A61B 1/0008 600/156 |
| 2008/0009747 | A1* | 1/2008 | Saadat | A61B 1/04 604/510 |
| 2008/0058586 | A1* | 3/2008 | Karpiel | A61B 1/00089 600/104 |

(Continued)

*Primary Examiner* — Shaun L David
(74) *Attorney, Agent, or Firm* — Fay Kaplun & Marcin, LLP

(57) ABSTRACT

An assembly for a closure device includes a cap with a distal portion having a recess to receive tissue and a proximal portion fitting over a face of an endoscope. The proximal portion includes fold(s) between a first region and a first end of a second region. The cap expands from a collapsed state in which an angle of the first region relative to a longitudinal axis of the endoscope is at a minimum to an expanded state in which the angle is increased. Based on the angle and reflectivity of the first region, an endoscopic camera on the face is provided an increased field of view in the expanded state relative to the collapsed state. The device captures tissue when the cap is in the expanded state via an actuation mechanism extending through a channel of the endoscope into the distal portion.

20 Claims, 5 Drawing Sheets

(56) References Cited

U.S. PATENT DOCUMENTS

| | | | |
|---|---|---|---|
| 2008/0058591 A1* | 3/2008 | Saadat | A61B 17/0057 |
| | | | 600/109 |
| 2008/0108874 A1* | 5/2008 | Waller | A61B 17/12013 |
| | | | 606/140 |
| 2008/0300460 A1 | 12/2008 | Sugita | |
| 2009/0275842 A1* | 11/2009 | Saadat | A61B 1/05 |
| | | | 600/478 |
| 2013/0225934 A1* | 8/2013 | Raybin | A61B 1/00089 |
| | | | 606/170 |
| 2017/0049415 A1* | 2/2017 | Tsuruta | A61B 5/683 |
| 2018/0296220 A1* | 10/2018 | Zein | A61B 17/0467 |
| 2019/0380564 A1* | 12/2019 | Viala | A61B 1/0014 |
| 2020/0315444 A1 | 10/2020 | Ramanujam et al. | |
| 2020/0330082 A1* | 10/2020 | Chin | A61B 10/0291 |
| 2021/0361147 A1* | 11/2021 | Smith | A61M 5/1452 |

\* cited by examiner

EXTENDABLE CAPS FOR ENDOSCOPIC CLOSURE DEVICES

PRIORITY CLAIM

The present disclosure claims priority to U.S. Provisional Patent Application Ser. No. 63/379,394 filed Oct. 13, 2022; the disclosure of which is incorporated herewith by reference.

FIELD

The present disclosure relates to endoscopic tissue gripping devices and more particularly to extendable and/or expandable caps for an endoscopic device that provide greater visualization for an endoscopic camera while facilitating the deployment of tissue gripping devices.

BACKGROUND

Hemostatic clips are used to close a variety of openings in internal tissues. For larger openings or to treat larger tissue defects, an over the scope clip (OTSC) is often used as these can often capture a larger volume of tissue than clips that are passed through a working channel of an endoscope. OTSC devices often include an over the scope cap that is attached to the distal end of an endoscope on a clip is preloaded. Suction or a grasping means can be applied to pull the tissue into the internal volume of the cap so that the clip may then be deployed from the distal end of the cap to grip the tissue that had been drawn into the cap. In a similar manner, ligation bands may be deployed from a cap attached to the distal end of an endoscope so that the bands can be released from the cap to constrict around tissue that had been drawn into the cap.

As these devices may both obstruct part of the field of view of the endoscopic vision system, users may have difficulty clearly visualizing the target tissue and confirming that a desired portion of tissue has, in fact been drawn into the cap before the clip or band is deployed therefrom. A clip or band deployed in the incorrect location or which has not fully captured the desired tissue may require removal and/or relocation.

SUMMARY

The present disclosure relates to an assembly for an endoscopic closure device includes a cap. The cap includes a distal portion comprising a recess configured to receive a target tissue for capture by the closure device and a proximal portion sized and shaped to fit over a distal face of an endoscope. The proximal portion is formed of a flexible material and comprising at least one fold between a first region and a first end of a second region. The distal portion and the proximal portion are connected at a joint at a proximal end of the distal portion and a second end of the second region. The cap expands from a collapsed state in which an angle of the first region relative to a longitudinal axis of the endoscope is at a minimum to an expanded state in which the angle is increased. An inner surface of the first region is reflective and, based on the angle and reflectivity of the first region, an endoscopic camera on the distal face of the endoscope is provided an increased field of view in the expanded state relative to the collapsed state. The closure device is deployable to capture the target tissue received in the recess of the distal portion when the cap is in the expanded state via an actuation mechanism extending through a working channel of the endoscope into the distal portion.

In an embodiment, in the collapsed state, a distance between the distal face of the endoscope and the proximal end of the distal portion is at a minimum and a curvature of the fold is at a maximum and wherein, in the expanded state, the distance is increased and the curvature of the fold is decreased to provide the increased field of view of the endoscopic camera.

In an embodiment, a proximal end of the first region of the proximal portion is sized and shaped to fit snugly to an exterior of the endoscope at a location proximal to the distal face of the endo scope and a distal end of the first region at the fold extends to a location distal to the distal face of the endoscope. The second region extends proximally from the first end at the fold to the second end at the joint.

In an embodiment, in the collapsed state, the joint is adjacent to the distal face of the endoscope and, in the expanded state, the joint translates distally to provide the distance between the distal face of the endoscope comprising the endoscopic camera and the proximal end of the distal portion.

In an embodiment, the cap is biased in the expanded state and a pull string extending through the working channel of the endoscope is actuated to pull the distal portion of the cap proximally to decrease the distance between the distal face of the endoscope and the proximal end of the distal portion. When the distance is decreased, the flexible material of the proximal portion is forced to increase the curvature of the fold and decrease the angle of the first region relative to the longitudinal axis of the endoscope.

In an embodiment, the cap is biased in the collapsed state and a flexible member extending through the working channel of the endoscope is actuated to push the distal portion of the cap distally to increase the distance between the distal face of the endoscope and the proximal end of the distal portion. When the distance is increased, the flexible material of the proximal portion is forced to decrease the curvature of the fold and increase the angle of the first region relative to the longitudinal axis of the endoscope.

In an embodiment, the cap further comprises a feature to prevent the target tissue captured in the recess of the distal portion from extending proximally to the proximal end of the distal portion.

In an embodiment, the feature comprises a dividing fin, a web, a strand, or a grid extending transversely across the proximal end of the distal portion.

In an embodiment, the feature comprises a transparent plate extending transversely across the proximal end of the distal portion and wherein the plate includes a hole for passage of the closure device.

In an embodiment, the actuation mechanism is actuatable from a proximal end of the endoscope.

In an embodiment, the actuation mechanism of the closure device and an expansion mechanism of the cap are keyed to one another so that expanding the cap causes the actuation mechanism to trigger and the closure device to deploy.

In an embodiment, the expansion mechanism comprises a flexible member extending through the working channel of the endoscope to push the distal portion of the cap distally, and wherein, when the distal portion of the cap is pushed distally to a trigger point, the closure device is urged into deployment.

In an embodiment, the expansion mechanism comprises a pull string extending through the working channel of the endoscope and wherein, when the pull string is tensioned as the cap expands, the pull string provides a force to urge the closure device into deployment.

In an embodiment, the closure device is in contact with the first region and, as the first region expands, the closure device is urged into deployment.

In an embodiment, the actuation mechanism includes at least one wire to deploy the closure device.

In an embodiment, the closure device comprises a clip device.

In an embodiment, the closure device comprises a ligation banding device.

In an embodiment, the proximal portion includes more than one fold wherein, in the collapsed state, a distance between the distal face of the endoscope and the proximal end of the distal portion is at a minimum and a curvature of each of the folds is at a maximum and wherein, in the expanded state, the distance is increased and the curvature of each of the folds are decreased to provide the increased field of view of the endoscopic camera.

In an embodiment, in the expanded state, the first region comprises a flared shape.

In an embodiment, in the expanded state, the first region comprises a shape of a frustum of a cone.

The present disclosure also relates to an assembly for an endoscopic closure device. The assembly includes a cap which has a distal recess configured to receive a target tissue for capture by the closure device and a proximal recess sized and shaped to fit over a distal face of an endoscope and isolated from the distal recess by a divider. The divider has at least one hole for a catheter so that the distal recess is open to an interior of the catheter extending through the proximal recess and a working channel of the endoscope. The cap translates from a first position in which the proximal recess is mounted to the endoscope to a second position in which the cap is moved distally via a distal force applied to the catheter. The closure device is deployable to capture the target tissue received in the distal recess when the cap is extended to the second position via an actuation mechanism extending through the interior of the catheter into the distal recess.

In an embodiment, the catheter extends proximally from the divider through the proximal recess and the working channel to a location proximal to a proximal end of the working channel.

In an embodiment, the catheter terminates at a proximal end at a fitting for attachment to suction a tubing.

In an embodiment, a suction is applied to the distal recess via the catheter and maintained when the cap is extended to the second position.

In an embodiment, the suction is maintained via a slot extending along the catheter that is aligned with a suction opening at a proximal end of the endoscope.

In an embodiment, wherein the suction is maintained via an auxiliary suction device extended through the working channel.

In an embodiment, the actuation mechanism comprises a pull string extending through the catheter.

In an embodiment, the actuation mechanism comprises a pull string extending through the working channel outside the catheter, wherein the cap comprises a further hole sized and shaped to allow the pull string to pass through the divider.

In an embodiment, the closure device comprises a clip device or a ligation banding device.

BRIEF DESCRIPTION

DETAILED DESCRIPTION

Figure 1:
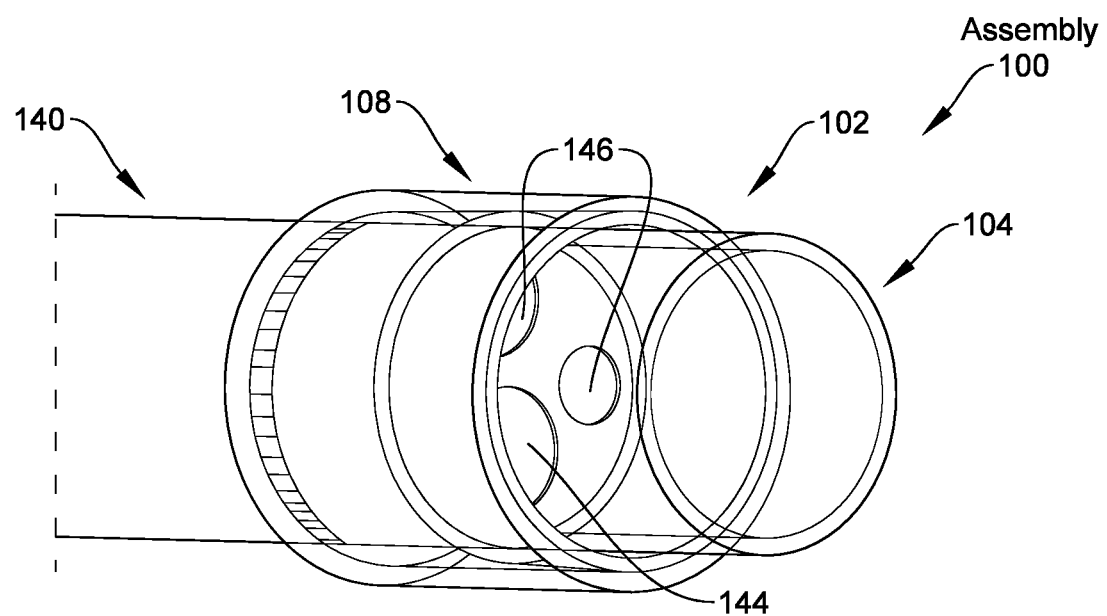
FIG. 1 shows an exemplary assembly including a scope cap attachable to a distal end of an endoscope and expandable from a collapsed state into a partially or fully expanded state according to various exemplary embodiments.

The present disclosure may be further understood with reference to the following description and the appended drawings, wherein like elements are referred to with the same reference numerals. The present disclosure relates to over the scope caps that can be extendable and/or expandable to increase an available field of view for an endoscopic camera. The exemplary caps can be used in coordination with various tissue gripping devices, including over the scope clips (OTSC), ligation bands, etc. to ensure the proper placement of the tissue gripping device prior to deployment.

In one aspect, the cap comprises a flexible proximal portion with a reflective surface that can expand to allow a user (e.g., a physician) to visualize the area surrounding a distal portion of the cap. In another aspect, the cap is connected or formed with a long flexible catheter extending through the working channel of the endoscope that can translate the cap from a retracted position pulled back toward the distal end of the endoscope to an extended position in which the cap is projected distally away from the distal face of the endoscope. In both of these exemplary aspects, the cap facilitates viewing by the user of surrounding tissue which might otherwise have been obscured by target tissue received in the distal portion or in a pocket of the cap, etc.

An existing method for closing a perforation or defect in tissue is to deploy a clip at the location of the defect by means of an over the scope clip (OTSC) device. These devices typically consist of a cap attached to the end of an endoscope with a clip preloaded on the cap. The endoscope is generally maneuvered to a target site within the body and suction or a grasping means is then applied to pull a target portion of tissue into an internal channel of a cap (e.g., via an open distal end of the cap). The clip is then pushed off of the distal end of the cap so that the clip snaps shot and any tissue within the cap is gripped by the clip. An over the scope cap may also be used in a manner similar to that employed with a ligation banding device to deploy one or more flexible ligation bands around target tissue that has been drawn into a channel of the cap in, e.g., the same manner described above for an OTSC in order, for example, to stop bleeding, to perform endoscopic mucosal resection EMR, etc.

Each of these applications generates similar visualization issues. For example, when applying a ligation band or an OTSC clip to tissue, it may be difficult to determine visually whether an entire target portion of tissue to be treated has been drawn into the cap so that the deployed clip or band will clip or ligate the tissue as desired. When drawn into the cap, the target tissue may obstruct the view from the camera of the endoscope impairing visualization of the surrounding tissue. Clips deployed in the incorrect location can require removal and/or relocation.

According to various exemplary embodiments described herein, an over the scope cap may be expanded or extended to provide enhanced visualization of a target area and surrounding tissue via an endoscopic vision system. In some embodiments, the cap includes an expandable cross-section comprising a fold or pleat which, in one embodiment, is biased toward a collapsed state, an expanded state, or a partially expanded state, and where some regions of the cap are, as described in more detail below, transparent and other regions are reflective to expand the field of view of the endoscopic camera. In other embodiments, the cap can be translated distally away from the distal face of the endoscope via a long flexible catheter to enhance visualization of the tissue outside the cap via the endoscopic camera. That is, as the cap is extended distally away from the distal end of the endoscope, the tissue drawn into the cap will be separated distally from the vision system by a greater distance and will, consequently, occlude less of the field of view of the vision system permitting enhanced visualization of the tissue drawn into the cap as well as the tissue surrounding this captured tissue.

According to one aspect of these exemplary embodiments, a scope cap comprises at least one area formed of a flexible material with at least one collapsible or expandable fold or pleat. Some regions of the cap of these embodiments are transparent, while other regions are reflective. In these embodiments, the exemplary cap permits a user to control a distance between the optical lens and the distal end of the scope cap. The reflective portions of the cap are configured to provide visualization of the tissue surrounding the cap.

Figure 2:
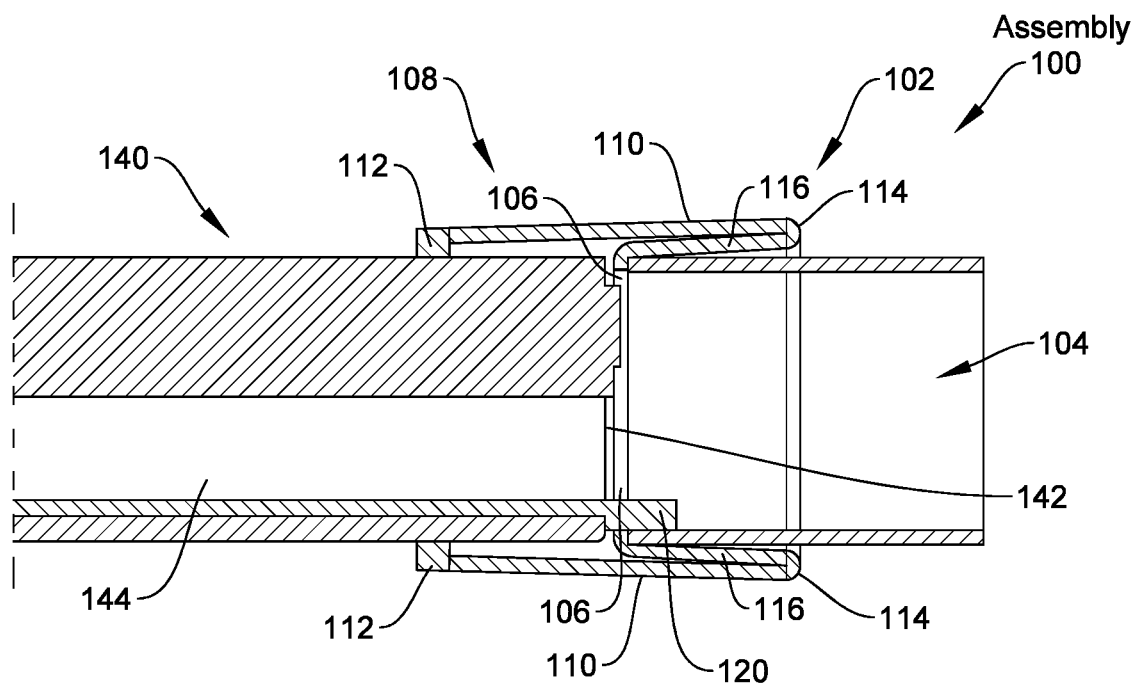
FIG. 2 shows a cross-sectional view of the assembly of FIG. 1 when the scope cap is in the collapsed state.
Figure 3:
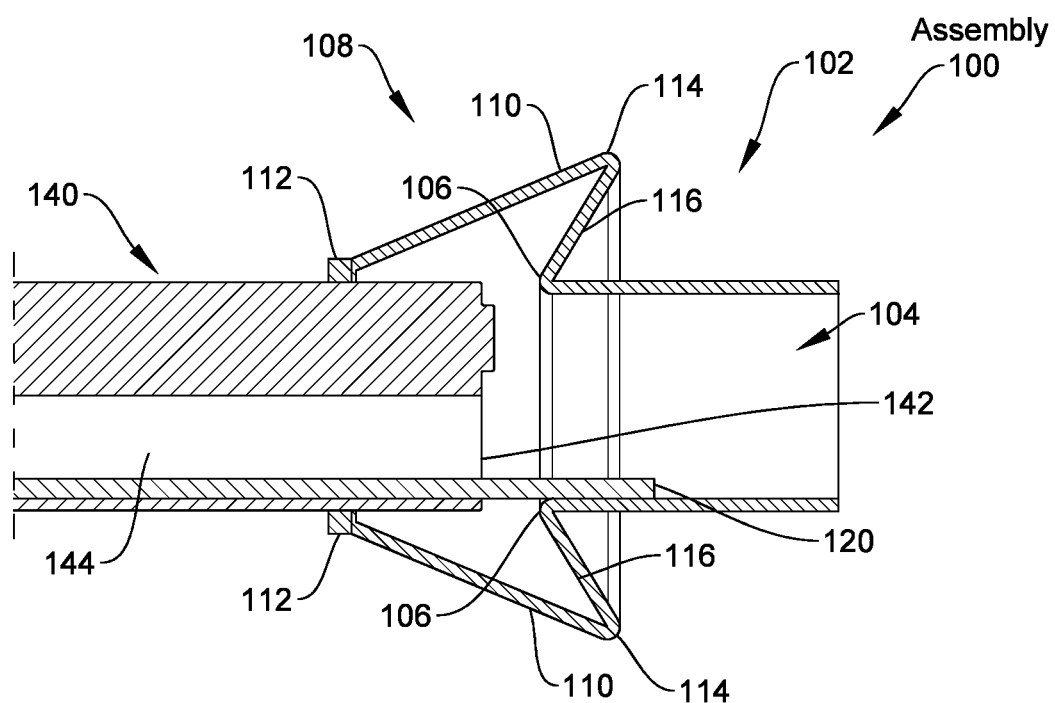
FIG. 3 shows a cross-sectional view of the assembly of FIG. 1 when the scope cap is in the expanded state.

FIGS. 1-3 show an exemplary assembly 100 for an endoscopic closure device, the assembly 100 including a scope cap 102 attachable to a distal end 142 of an endoscope 140 where the cap 102 is expandable from a collapsed state into a partially or fully expanded state according to various exemplary embodiments. The cap 102 comprises a distal portion 104 for capturing tissue therein and an expandable proximal portion 108 that attaches to the distal end of the endoscope 140. The proximal portion 108 and the distal portion 104 of this embodiment are connected to one another at a joint 106. In a further embodiment, the proximal portion 108 may be integrally formed with the distal portion 104.

It is noted that a cross-section of the cap 102 of this embodiment, including the proximal portion 108, distal portion 104 and joint 106, is substantially circular any given location along the length of the cap 102. The distal portion 104 may be cylindrical while the joint 106 describes a circular transition point between the distal portion 104 and the proximal portion 108. The joint 106 and/or the distal portion 104 may then have a cross-section substantially similar to that of the endoscope 140. The proximal portion 108 may have regions that are, in the collapsed state, substantially cylindrical (or slightly conical) while these regions may be conical in the expanded state, as will be described in more detail below.

Those skilled in the art will understand that the shape of the cap 102 or different parts of the cap 102 may be varied depending on the geometry of the endoscope 140 to which it is to be attached, a shape of a target portion of tissue to be ligated, etc. That is, a cap 102 may include a proximal portion 108 configured to conform to the size and shape of the distal end of an endoscope to which it is to be attached. Thus, if the endoscope has a non-circular distal end, the proximal portion 108 of the cap 102 will be similarly non-circular. Furthermore, depending on the shape and size of the tissue to be captured, the shape and/or size of the distal portion 104 of the cap 102 may be shaped differently from the proximal portion 108. For example, the distal portion 104 may be elongated along any desired axis if it is desired to capture tissue along an elongated shape as opposed to a circular portion of tissue that would be captured within a circular distal portion 104.

The proximal portion 108 is formed of flexible material and is sized and shaped so that it may slide over the distal end 142 of the endoscope 140 (e.g., with a friction fit) while remaining clear of the optics (e.g., camera and lighting) and working channel of the endoscope 140 (e.g., working channel 144 and features for optics), as would be understood by those skilled in the art. The proximal portion 108 of this embodiment comprises a first region 110 that, at a proximal end 112, attaches snugly to an exterior of the endoscope 140 at a location proximal to the distal end 142 of the endoscope 140.

It should be understood that the inner surface of the proximal end 112 of the first region 110 is sized and shaped to correspond to the shape and size of the outer surface of the endoscope 140, which typically has a circular cross-section although, the size and shape of the proximal portion may be varied as necessary to permit the mounting of the cap 102 on the endoscope 140 as desired. The distal end of the first region 110 forms a curve (or fold) 114 with a first end of a second region 116 (extending proximally from the fold 114 to the joint 106) connecting the proximal portion 108 to the distal portion 104. This curved structure including the first region 110, the fold 114 and the second region 116 is referred to herein as a "pleat."

In the example shown in FIGS. 1-3, the cap 102 includes a single fold 114 or pleat. However, in alternative embodiments, the cap 102 may include multiple folds or pleats. It should be understood that the term "pleat" as used herein refers to a circumferential (e.g., circular/cylindrical or conical) region folded in upon itself to define a line of separation between two circumferential regions extending in directions opposite one another (i.e., one extending distally while the other extends proximally).

When the cap 102 is in the collapsed state, as shown in FIGS. 1-2, the first and second regions 110, 116 of the proximal portion 108 extend in directions substantially parallel (or angled a few degrees relative) to the longitudinal axis of the endoscope 140 at its distal end 142 such that an angle formed by the first and second regions 110, 116 is minimal. In other words, the first region 110 of this embodiment is substantially cylindrical or describes a frustum of a cone with a small apex angle. The first region 110 extends substantially distally from the proximal end 112 to the fold 114. In the collapsed state, the fold 114 describes a curve of approximately 180 degrees (e.g., a maximum curvature) such that the second region 116 extends substantially proximally from the fold 114 to the joint 106 connecting the proximal portion 108 to the distal portion 104. In the collapsed state, the joint 106 defining the proximal end of the distal portion 104 abuts the distal end 142 of the endoscope 140.

When the cap 102 is in the expanded (or partially expanded) state, as shown in FIG. 3, the first region 110 is expanded from the substantially cylindrical shape (of the collapsed state described above) into a frustum of a cone with an apex angle of, in one embodiment, approximately 45 degrees at its maximum, e.g., flared shape. The angle of the first region 110 relative to the longitudinal axis of the endoscope 140 will be half the apex angle of the frustum of the cone. However, this angle of the first region 110 may vary. Accordingly, when the curvature of fold 114 is decreased from a maximum curvature (e.g., 180 degrees) to a low curvature (e.g., 45 degrees), the field of view of an endoscopic camera is increased.

As will be described in further detail below, the angle of the first region 110 in the expanded state is selected to broaden (e.g., increase) a field of view of the endoscopic camera located, in this embodiment, in a region 146 in the distal end 142 (e.g., a distal face) of the endoscope 140. The degree of expansion of the first region 110 is controlled by the user operating the endoscope 140 so that the angle of the first region 110 is less than its maximum angle, at the discretion of the operating physician, to provide optimal visualization of the tissue from a point of view outside the original circumference of the cap 102 as will be described in greater detail below.

As the cap 102 is expanded and the angle of the first region 110 increases, the fold 114 at the distal end of the first region 110 is forced radially outward to a circumference greater than the original circumference of the fold 114 in the collapsed state. As the circumference of the fold 114 increases, the curve at the fold 114 is reduced from the approximately 180 degrees of the collapsed state to approximately 150 degrees, such that an angle between the first region 110 and the second region 116 at the fold 114 comprises approximately 30 degrees. Those skilled in the art will ascertain that the various angles describing the shape of the proximal portion 108 in the expanded state will vary depending on the length of the first region 110, the length of the second region 116, the flexibility of the proximal portion 108, etc.

As the proximal portion 108 expands, the location of the joint 106 between the proximal portion 108 and the distal portion 104 translates distally, as shown in FIG. 3, so that the proximal end of the distal portion 104 is brought out of abutting contact with the distal end 142 of the endoscope 140. Those skilled in the art will ascertain that, as the angle of the first region 110 increases, the distance between the distal portion 104 and the distal end 142 of the endoscope 140 will also increase.

The distal portion 104 may be formed of a flexible material, can be cylindrical and have a circumference similar to that of the endoscope 140 or may have a different shape and size if desired. The distal portion 104 is open-faced on its distal end (i.e., includes an open distal end opening into a channel within the cap 102) to permit tissue to be drawn into the cap 102 and is transparent on its proximal end (at the joint 106) to provide visualization therethrough via the endoscopic camera when the cap 102 is in the collapsed state or the expanded state (assuming that tissue is not yet received in the distal portion 104 and/or blocking the visualization of the endoscopic camera).

The cap 102 may be biased toward either the collapsed state (closed) or the expanded state (open) (i.e., so that, when no actuating force is applied to the cap 102, the cap 102 assumes the state toward which it is biased). In one embodiment, the cap 102 is biased toward the open state and an actuating force to maintain the cap 102 in the closed state is supplied via, for example, a pull string (e.g., a suture) run through the working channel 144 of the endoscope 140 and attached to the distal portion 104 of the cap 102 at the joint 106 or elsewhere on the distal portion 104.

The pull string may then be used to pull the distal portion 104 proximally, bringing the joint 106 into contact with the distal end 142 of the endoscope 140 (or to any other proximal-most position of the joint 106), and forcing the pleat closed. When the pull string is released, the cap 102 is allowed to expand. It should be understood that the tension can be applied to the pull string via, e.g., a support structure proximal to or at the proximal end of the endoscope 140 or manually by an operating physician during deployment of the endoscope 140 to the target site.

In another embodiment, the cap 102 can be biased toward the closed position while the actuating force may be asserted via a flexible member 120, e.g., a rod, run through the working channel of the endoscope 140 and attached to the joint 106 or elsewhere on the distal portion 104, as shown in FIGS. 2-3. The member 120 may then be used to push the distal portion 104 distally to force the pleat open (or partially open). When the member 120 is withdrawn, the cap 102 is allowed to collapse under its natural bias to return to the closed position.

The inner surface of the first region 110 of the proximal portion 108 in one embodiment is reflective while the second region 116 is transparent. As the cap 102 is expanded, the distal portion 104 is moved away from the distal end 142 of the endoscope 140. The reflective surface of the first region 110 alters a field of view of the endoscopic camera (e.g., image sensor) as the first region 110 is angled relative to a longitudinal axis of the endoscope 140 such that tissue outside the original circumference of the cap 102 can now be visualized in the reflection. If tissue has been suctioned into the distal portion 104 of the cap 102 in the collapsed state, obscuring the image sensor, this tissue will be pulled away from the optical lens (or the endoscope 140 will be correspondingly withdrawn proximally from the tissue) and the area surrounding the tissue can be more clearly viewed. The cap may, in the expanded state, be radially expanded as well as longitudinally expanded to provide better visualization of the space.

Additional features can be added to the cap 102 to prevent the tissue from maintaining contact with the lens—i.e., limiting the extent to which tissue may enter proximally into the cap 102. These features could comprise, e.g., a dividing fin; a web; a strand bisecting the cap lumen that is tensioned during expansion; a grid extending transversely across the proximal end of the distal portion 104; or an optical clear plate. These features could be integrated with and/or activated during the expansion to, e.g., translate away from the optical lens during expansion of the cap 102. If a clear plate is used, a hole can be provided therethrough for passage of a grasper or suction.

The deployment of a ligation band or clip (e.g., OTSC) could be accomplished by a pull string technique known in the art. Alternatively, the deployment could be accomplished by one of the following techniques.

In one embodiment, the action of extending the cap could be used to trigger the deployment. In a first stage of extension, the band or clip could remain retained in or on the cap while the proximal portion of the cap is expanded to enhance visualization of the target tissue. In a second stage of extension, the band/clip could be urged by an element applying force to the band/clip to move relative to the distal end of the cap. In one example, the pull string technique can be used wherein, expansion of the cap beyond a controlled point automatically tensions the string and applies the force to the band/clip to urge it distally to deploy—i.e., the string is held taught as the cap 102 is expanded and the band/clip is moved distally increasing the tension on the string until the band/clip passes a point at which a natural bias of the band/clip constricts the band/clip so that the band/clip is moved distally off the cap 102 by its own bias as would be understood by those skilled in the art. In an embodiment, the expansion mechanism of the cap 102 may be keyed to an actuation mechanism to deploy the closure device.

Figure 4:
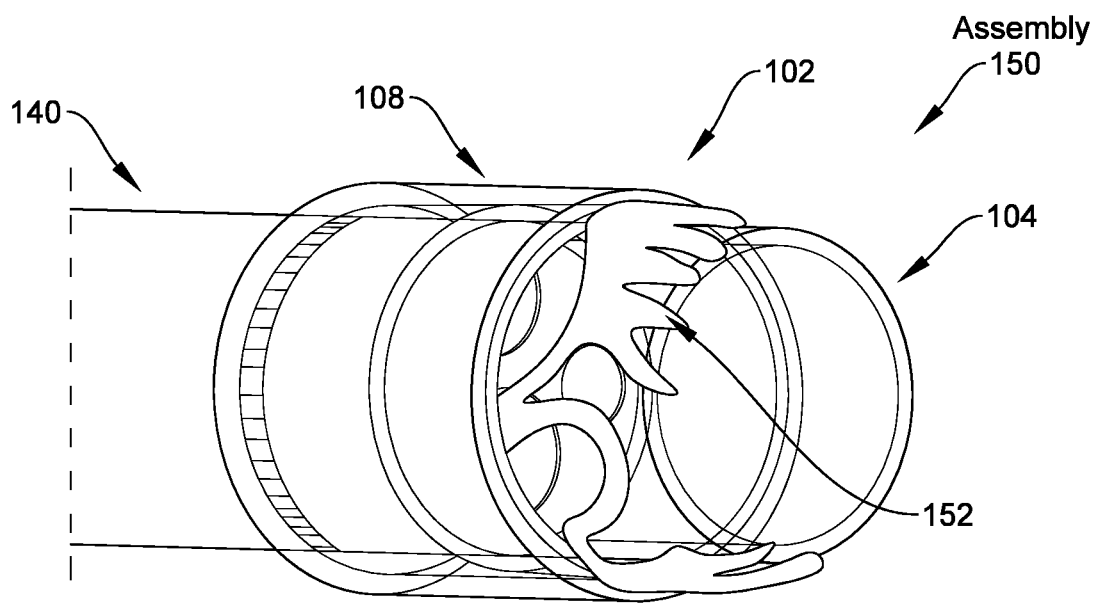
FIG. 4 shows an assembly including the endoscope and scope cap described in FIGS. 1-3 and further including a clip device according to various exemplary embodiments.
Figure 5:
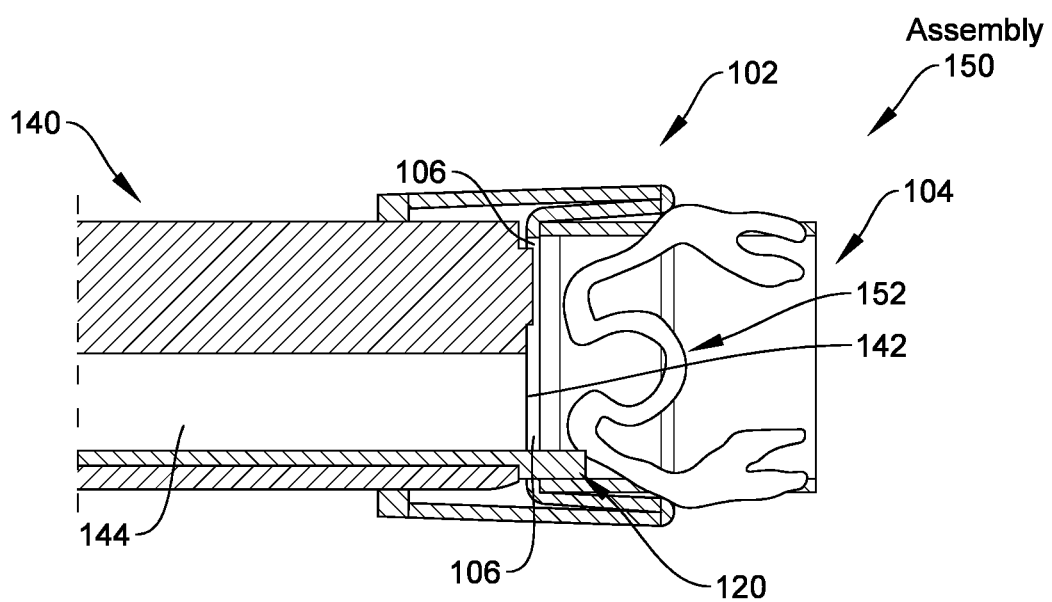
FIG. 5 shows a cross-sectional view of the assembly of FIG. 4 when the scope cap is in the collapsed state and the clip device is open.
Figure 6:
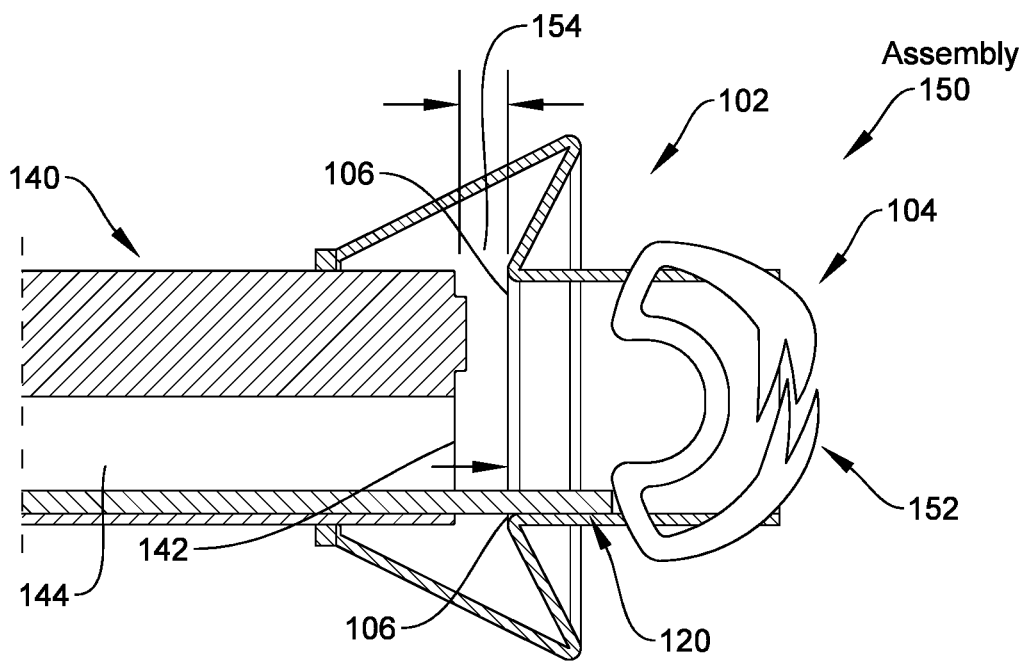
FIG. 6 shows a cross-sectional view of the assembly of FIG. 4 when the scope cap is in the expanded state and the clip device is deployed.

FIGS. 4-6 show an assembly 150 including the endoscope 140 and the cap 102 described in FIGS. 1-3 and further including a clip device 152 according to exemplary embodiments. In this example, when the cap 102 is in the collapsed state, as shown in FIGS. 4-5, the clip is biased toward the closed state and is restrained in an open and/or undeployed state by being stretched over the circumference of the cap 102. As the cap 102 is expanded distally, a feature at or near the proximal end of the distal portion 104, e.g., the member 120, urges the clip towards deployment so that, when the clip is moved off of the distal end of the cap 102 and no longer held open by the cap 102, the clip snaps closed (into the closed state) under its natural bias to clip tissue that had previously been drawn in to the cap 102, as shown in FIG. 6.

As described above, the cap 102 of one embodiment further includes a feature at the joint 106 and/or the proximal end/face of the distal portion 104 preventing the captured tissue from extending proximally into the cap 102 beyond a desired proximal-most point. Thus, a gap 154 is maintained between the tissue within the cap and the endoscopic camera at the distal end 142, as shown in FIG. 6, so that an operating physician can inspect the area surrounding the captured tissue. As described above, the cap 102 can be expanded in a first stage to allow for visualization and a second stage can close/deploy the clip.

In another embodiment, the clip contacts the expansion portion of the cap so that movement of the expansion element moves urges the clip distally. With this concept, the expansion portion may be configured to hold/restrain the clip from a propensity to deploy. That is, the expansion portion provides a stop that restrains the clip so that the clip deploys under its own bias as soon as the expansion portion is moved to remove the restraint on distal motion of the clip over the cap 102.

The clip's propensity to deploy may be generated by a slight tapering angle to the surface of the cap 102 (i.e., an outer diameter of the cap 102 is reduced as the distal end of the cap 102 is approached) and the natural bias that urges the clip to close pulls the clip distally over this tapered surface as it closes. In this embodiment, the expansion portion, in a non-expanded state, provides a shoulder or increased diameter surface distal of the clip which, as the expansion portion is expanded, is reduced in diameter to permit the clip to move distally under its bias. In still another embodiment, one or more wires can be used to push and/or pull the clip proximally onto or distally off of the cap 102.

According to another aspect of these exemplary embodiments, a scope cap is connected or formed with a long flexible catheter extending through the working channel of the endoscope configured to translate the cap from a mounted position on the distal end of the endoscope to an extended position distal of the distal face of the endoscope. The exemplary cap comprises a shallow recess or pocket on a proximal portion thereof that is isolated from a deep recess/pocket on a distal portion configured for receiving and capturing tissue. A deployment mechanism, e.g., pull string, for a grasper (e.g., clip) or ligation band extends through the flexible catheter into the distal pocket to deploy the clip/band even when the cap is in the extended position.

Figure 7:
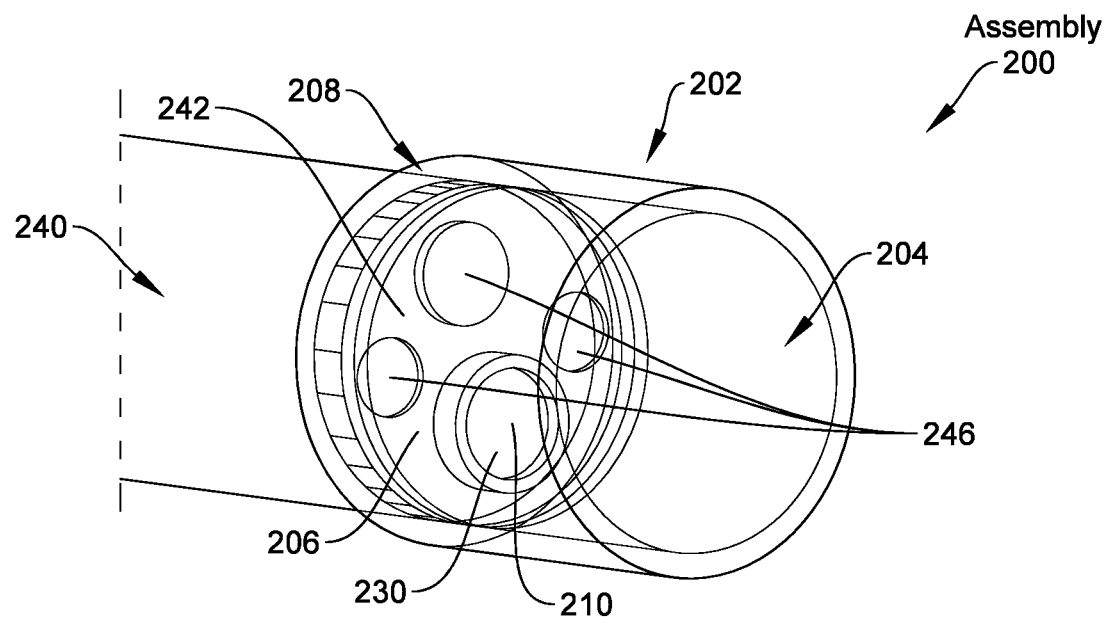
FIG. 7 shows an assembly including a scope cap attachable to a distal end of an endoscope and translatable from a mounted position on the endoscope to an extended position distal to the distal end of the endoscope according to various exemplary embodiments.
Figure 8:
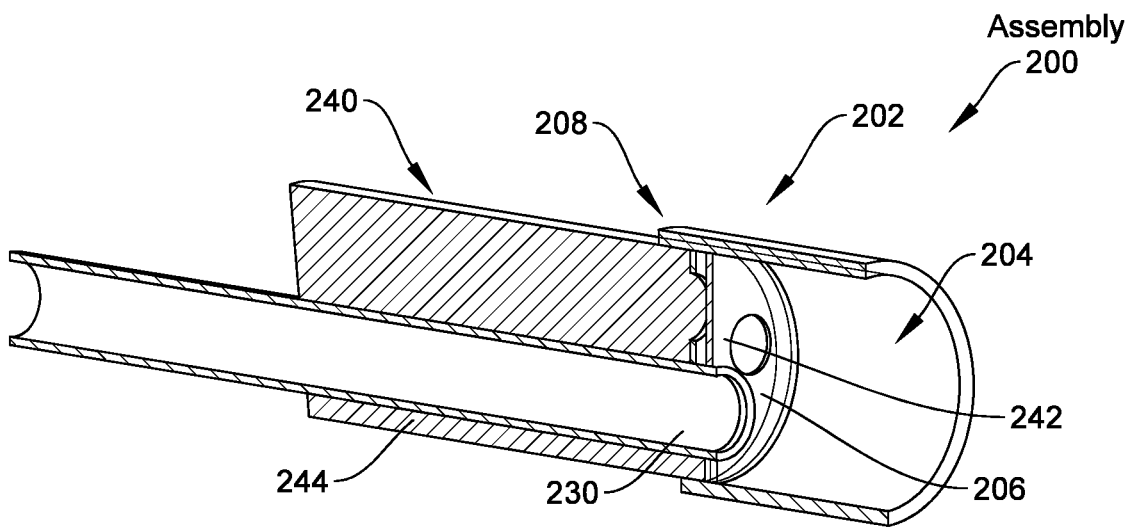
FIG. 8 shows a cutaway view of the assembly of FIG. 7 when the scope cap is in the mounted position.
Figure 9:
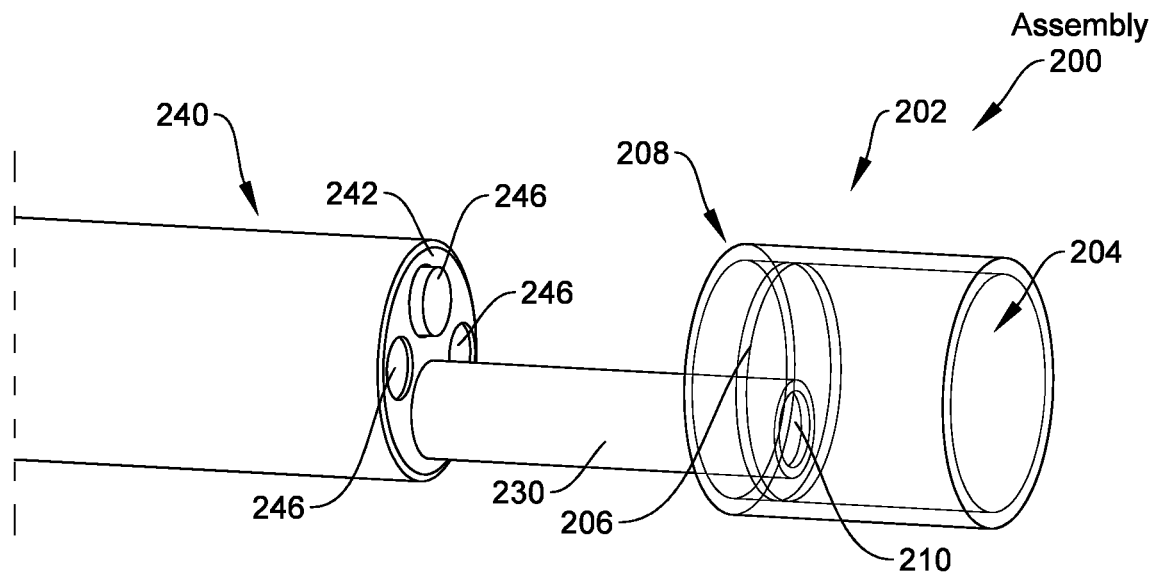
FIG. 9 shows the assembly of FIG. 7 when the scope cap is in the extended position.

FIGS. 7-9 show an exemplary assembly 200 including a scope cap 202 attachable to a distal end 242 (e.g., a distal face) of an endoscope 240 and translated from a mounted position to an extended position according to exemplary embodiments. The cap 202 comprises a distal portion 204 (e.g., a distal recess or a distal pocket) configured for capturing tissue therein and a proximal portion 208 (e.g., a proximal recess or a proximal pocket) configured to be attached to the distal end 242 of the endoscope 240. The proximal portion 208 and the distal portion 204 are separated and isolated from one another by a divider 206. The divider 206 includes a hole 210 sized to permit a catheter 230 to pass through the proximal portion 208 into the distal portion 204 and terminate so that the inner diameter of the catheter 230 is open to the distal portion 204, whereupon suction, clip/band deployment, and/or other features can be applied.

The proximal portion 208 is sized and shaped to fit snuggly over the distal end 242 of the endoscope 240 so that the divider 206 is brought adjacent to the distal end 242. One or more tubes (e.g., catheters) can extend through the proximal portion 208 to an opening in the divider 206 so that the distal portion 204 is open to the inner diameter (ID) of the tubes. In this example, the cap 202 comprises a single long flexible catheter (e.g., the catheter 230) open to the distal portion 204. The distal portion 204 has an open distal face and is isolated from the proximal portion 208 and open to the ID of the catheter 230. The divider 206 between the proximal portion 208 and the distal portion 204 is, in this embodiment, transparent, to allow the optics (e.g., camera and lighting) of optics features 246 to visualize the area when the scope cap 202 is mounted to the distal end 242.

The catheter 230 is located and sized such that when the cap 202 (e.g., the proximal portion 208) is seated on the distal end 242 it will fit within and run the length of a working channel (e.g., a working channel 244) of the endoscope 240. The proximal end of the catheter 230 terminates with a fitting at a point some distance outside the proximal end of the working channel. This fitting is in one embodiment designed to attach to suction tubing that is further proximally connected to a source of suction (e.g., a pump) or long enough to connect to the suction source on its own without the intervening tubing. This would prevent loss of suction due to clearance between the inner diameter of the working channel and the outer diameter of the catheter 230.

The distal portion 204 can have the distal face pressed against a region of tissue where the operating physician wishes to deploy a clip or band. The tissue can be pulled into the interior volume of the distal portion 204. At this point, if the operating physician desires to inspect the placement of the clip/band before deploying, the proximal end of the catheter 230 is advanced into the working channel of the endoscope 240. When this is done, the cap 202 moves away from the distal end 242 of the endoscope 240 and allows for enhanced visualization of the tissue outside the cap 202 via optics features 246. Suction is maintained in the interior of the distal portion 204 during this inspection, so as to not lose grip on the tissue.

Suction can be maintained in the cap 202 in different ways. The device could use the original suction action supplied by a standard endoscope by having a slot along the catheter 230 inside the working channel that lines up with the suction opening in the proximal end of the endoscope 240. Alternatively, the device could use an auxiliary suction device that comes in through the end of the working channel. In either of these cases, the string from a traditional pull string technique may run down the inside of the catheter 230 or on the outside of the catheter 230 within the working channel. If the string is on the outside of the working channel, a very small hole would be needed in the divider 206 to allow the string to pass through the center of the cap 202 into the distal portion 204. This small hole could provide the additional benefit of draining the fluid that is suctioned up to improve the suctioning of tissue.

By using the cap 202, the operating physician can more clearly visualize the deployment of the clip/band via pull string by viewing the target tissue and the area surrounding the target to ensure proper placement of the clip/band.

Figure 10:
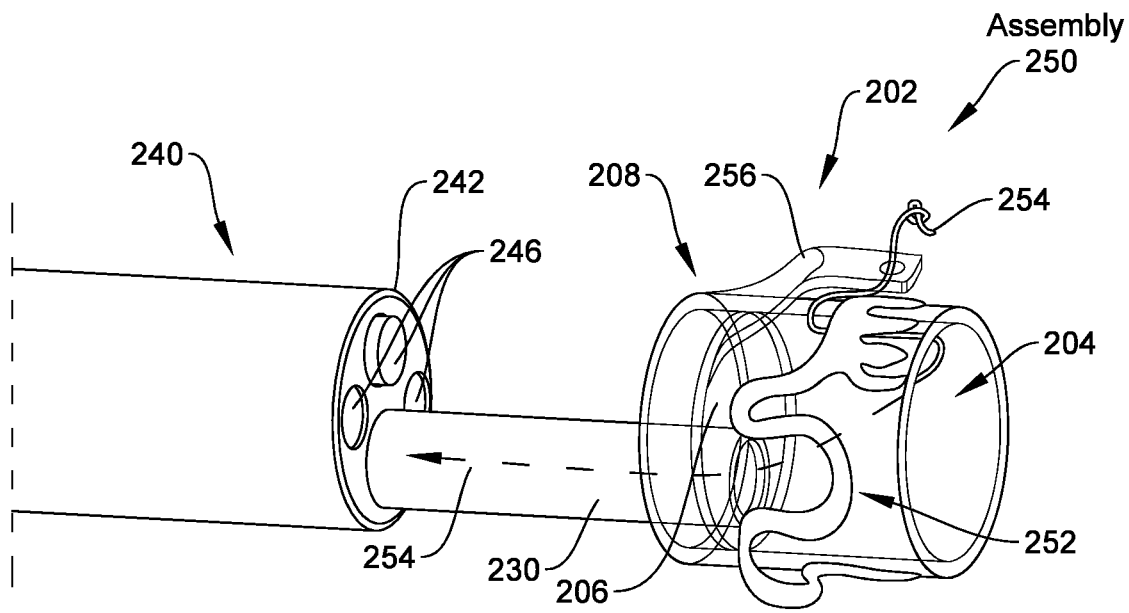
FIG. 10 shows an assembly including the endoscope and scope cap described in FIGS. 7-9 and further including a clip device according to various exemplary embodiments.

FIG. 10 shows an assembly 250 including the endoscope 240 and the cap 202 as described in FIGS. 7-9 and further including a clip device 252 according to exemplary embodiments. In this example, when the cap 202 is in the extended position, as shown in FIG. 10, the clip device 252 can be actuated by a pull string 254 that extends through the catheter 230 to a location proximal to the endoscope 240. The cap 202 of this embodiment further includes a feature 256, e.g., a bracket, outside the distal portion 204 for retaining the pull string 254.

The operating physician can then apply suction to draw a target portion of tissue into the distal portion 204 prior to deployment of the clip device 252. To ensure that the desired portion of tissue was captured correctly, the physician can then translate the cap 202 distally via the catheter 230 to expand the field of view of the endoscopic vision system and more clearly view the tissue surrounding the target tissue. If the tissue is satisfactorily captured, the physician can deploy the clip device 252 via the pull string 254.

It will be appreciated by those skilled in the art that changes may be made to the embodiments described above without departing from the inventive concept thereof. It should further be appreciated that structural features and methods associated with one of the embodiments can be incorporated into other embodiments. It is understood, therefore, that this invention is not limited to the particular embodiment disclosed, but rather modifications are also covered within the scope of the present invention as defined by the appended claims.

The invention claimed is:

1. An assembly for an endoscopic closure device, comprising:
a cap including a distal portion comprising a recess configured to receive a target tissue for capture by the closure device and a proximal portion sized and shaped to fit over a distal face of an endoscope, the proximal portion being formed of a flexible material and comprising at least one fold between a first region and a first end of a second region, the distal portion and the proximal portion being connected at a joint at a proximal end of the distal portion and a second end of the second region,
wherein the cap expands from a collapsed state in which an angle of the first region relative to a longitudinal axis of the endoscope is at a minimum to an expanded state in which the angle is increased, wherein an inner surface of the first region is reflective and, based on the angle and reflectivity of the first region, an endoscopic camera on the distal face of the endoscope is provided an increased field of view in the expanded state relative to the collapsed state, and
wherein the closure device is deployable to capture the target tissue received in the recess of the distal portion when the cap is in the expanded state via an actuation mechanism extending through a working channel of the endoscope into the distal portion.

2. The assembly of claim 1, wherein, in the collapsed state, a distance between the distal face of the endoscope and the proximal end of the distal portion is at a minimum and a curvature of the fold is at a maximum and wherein, in the expanded state, the distance is increased and the curvature of the fold is decreased to provide the increased field of view of the endoscopic camera.

3. The assembly of claim 2, wherein a proximal end of the first region of the proximal portion is sized and shaped to fit snugly to an exterior of the endoscope at a location proximal to the distal face of the endoscope and a distal end of the first region at the fold extends to a location distal to the distal face of the endoscope, and wherein the second region extends proximally from the first end at the fold to the second end at the joint.

4. The assembly of claim 3, wherein, in the collapsed state, the joint is adjacent to the distal face of the endoscope and, in the expanded state, the joint translates distally to provide the distance between the distal face of the endoscope comprising the endoscopic camera and the proximal end of the distal portion.

5. The assembly of claim 2, wherein the cap is biased in the expanded state and a pull string extending through the working channel of the endoscope is actuated to pull the distal portion of the cap proximally to decrease the distance between the distal face of the endoscope and the proximal end of the distal portion, and wherein, when the distance is decreased, the flexible material of the proximal portion is forced to increase the curvature of the fold and decrease the angle of the first region relative to the longitudinal axis of the endoscope.

6. The assembly of claim 2, wherein the cap is biased in the collapsed state and a flexible member extending through the working channel of the endoscope is actuated to push the distal portion of the cap distally to increase the distance between the distal face of the endoscope and the proximal end of the distal portion, and wherein, when the distance is increased, the flexible material of the proximal portion is forced to decrease the curvature of the fold and increase the angle of the first region relative to the longitudinal axis of the endoscope.

7. The assembly of claim 1, wherein the cap further comprises a feature to prevent the target tissue captured in the recess of the distal portion from extending proximally to the proximal end of the distal portion.

8. The assembly of claim 7, wherein the feature comprises a dividing fin, a web, a strand, or a grid extending transversely across the proximal end of the distal portion.

9. The assembly of claim 7, wherein the feature comprises a transparent plate extending transversely across the proximal end of the distal portion and wherein the plate includes a hole for passage of the closure device.

10. The assembly of claim 1, wherein the actuation mechanism is actuatable from a proximal end of the endoscope.

11. The assembly of claim 10, wherein the actuation mechanism of the closure device and an expansion mechanism of the cap are keyed to one another so that expanding the cap causes the actuation mechanism to trigger and the closure device to deploy.

12. The assembly of claim 11, wherein the expansion mechanism comprises a flexible member extending through the working channel of the endoscope to push the distal portion of the cap distally, and wherein, when the distal portion of the cap is pushed distally to a trigger point, the closure device is urged into deployment.

13. The assembly of claim 12, wherein the closure device is in contact with the first region and, as the first region expands, the closure device is urged into deployment.

14. The assembly of claim 11, wherein the expansion mechanism comprises a pull string extending through the working channel of the endoscope and wherein, when the pull string is tensioned as the cap expands, the pull string provides a force to urge the closure device into deployment.

15. The assembly of claim 10, wherein the actuation mechanism includes at least one wire to deploy the closure device.

16. The assembly of claim 10, wherein the closure device comprises a clip device.

17. The assembly of claim 10, wherein the closure device comprises a ligation banding device.

18. The assembly of claim 1, wherein the proximal portion includes more than one fold wherein, in the collapsed state, a distance between the distal face of the endoscope and the proximal end of the distal portion is at a minimum and a curvature of each of the folds is at a maximum and wherein, in the expanded state, the distance is increased and the curvature of each of the folds are decreased to provide the increased field of view of the endoscopic camera.

19. The assembly of claim 1, wherein, in the expanded state, the first region comprises a flared shape.

20. The assembly of claim 1, wherein, in the expanded state, the first region comprises a shape of a frustum of a cone.

* * * * *